T. B. McLEROTH.
AIR TUBE FOR PNEUMATIC TIRES AND MOLD THEREFOR.
APPLICATION FILED NOV. 24, 1920.
1,379,929.
Patented May 31, 1921.
3 SHEETS—SHEET 1.
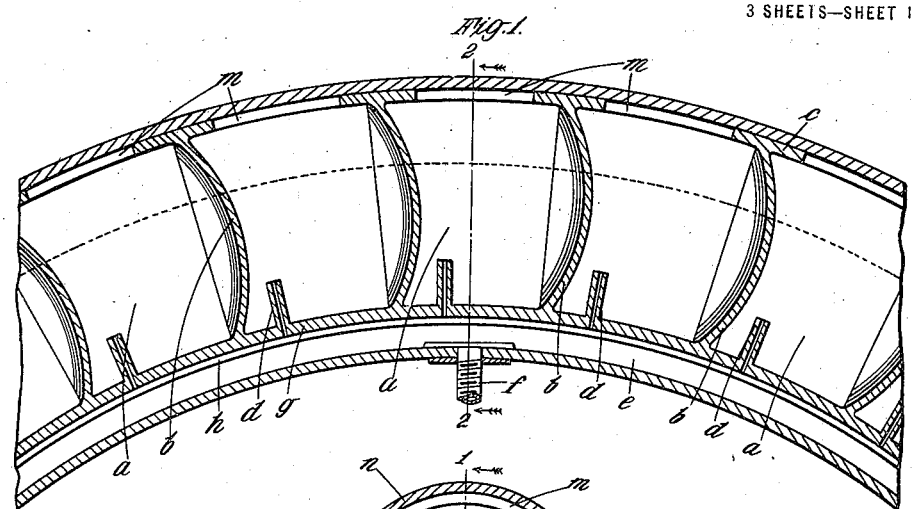
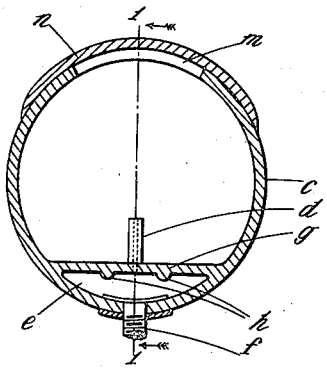
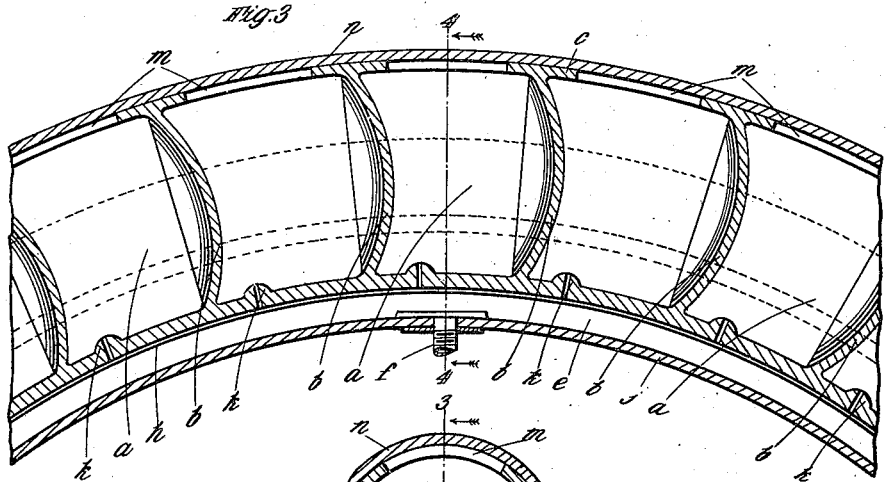
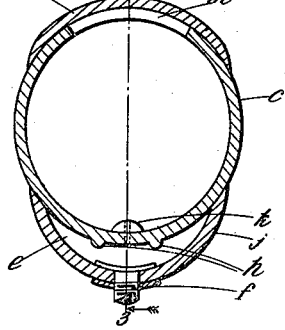
INVENTOR
THOMAS BAKER MC. LEROTH
ATTORNEYS

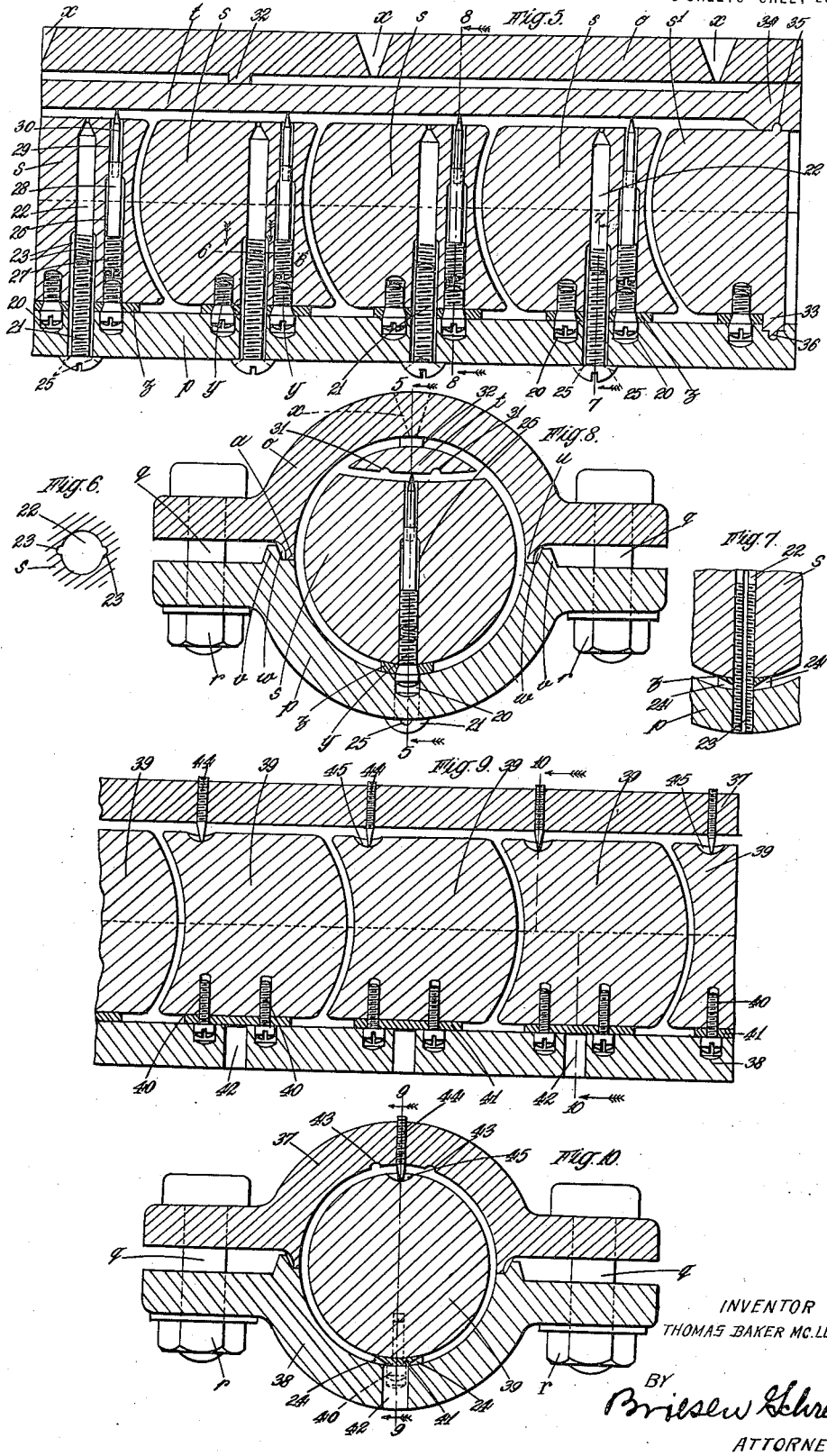

T. B. McLEROTH.
AIR TUBE FOR PNEUMATIC TIRES AND MOLD THEREFOR.
APPLICATION FILED NOV. 24, 1920.

1,379,929.

Patented May 31, 1921.

3 SHEETS—SHEET 3.

INVENTOR
THOMAS BAKER MC. LEROTH

BY
Bresen Schrenk
ATTORNEYS

UNITED STATES PATENT OFFICE.

THOMAS BAKER McLEROTH, OF LONDON, ENGLAND.

AIR-TUBE FOR PNEUMATIC TIRES AND MOLD THEREFOR.

1,379,929.        Specification of Letters Patent.        Patented May 31, 1921.

Application filed November 24, 1920. Serial No. 426,115.

*To all whom it may concern:*

Be it known that I, THOMAS BAKER MC-LEROTH, of 32 Caversham road, London, N. W. 5, England, a British subject, have invented certain new and useful Improvements in or Relating to Air-Tubes for Pneumatic Tires and Molds Therefor, of which the following is a specification.

This invention relates to an air tube for a pneumatic tire, of the kind comprising a plurality of sections or compartments so arranged that the puncturing of one section or compartment will not materially affect the efficiency of the tire as a whole.

According to this invention an air tube for a pneumatic tire comprises a series of sections or compartments formed by partitions, and a passage running around the inner periphery of the tube, and communicating with each of said sections or compartments, the wall of each of which is split or otherwise apertured to enable the core used for the production of said compartment to be withdrawn therefrom.

The communication between each of the sections or compartments and the passage which runs around the inner periphery of the tire (hereinafter called the feed passage) may be by way of a thin rubber tube, an apertured nipple, or like apertured projection from the passage into each chamber. The tube is preferably made in a straight length and its ends joined subsequently, and the feed passage may be formed integrally with the air tube or by a separate portion secured to said tube.

The mold in which the tube is made may comprise two outer sections divided on a substantially central plane and adapted to be clamped together, a plurality of cores within said sections, means carried by said sections and (or) by said cores for producing in the tube the apertures through which the compartments communicate with the feed passage and the slits or apertures through which the cores are to be withdrawn, and, if required, means for producing the feed passage integrally with the air tube.

Figure 11:
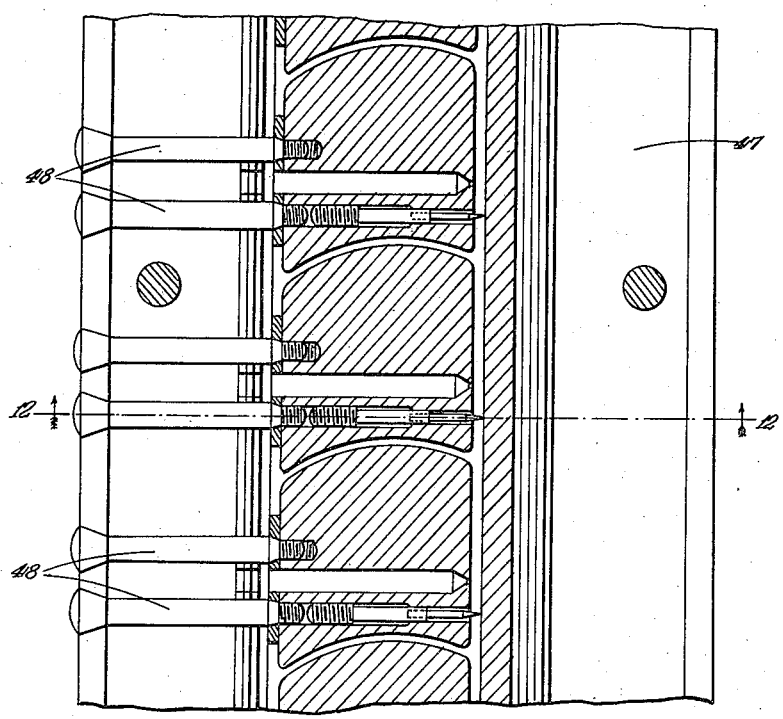
Figure 12:
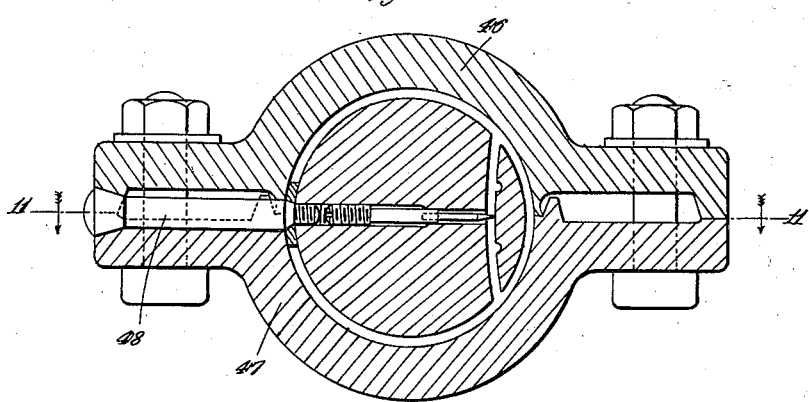

The invention is illustrated by the accompanying drawings wherein Figure 1 is a fragmentary section of one form of air tube, on the line 1—1, Fig. 2. Fig. 2 is a cross-section on the line 2—2, Fig. 1, Figs. 3 and 4 are similar views of a modified form of air tube, the sections being on the line 3—3, Fig. 4, and 4—4, Fig. 3, respectively. Fig. 5 is a section of a mold on the line 5—5, Fig. 8, Figs. 6 and 7 are enlarged sections of details on the lines 6—6 and 7—7, respectively, Fig. 5. Fig. 8 is a cross-section of the mold on the line 8—8, Fig. 5, Fig. 9 is a section of a modified form of mold on the line 9—9, Fig. 10. Fig. 10 is a cross-section of the mold on the line 10—10 Fig. 9, Fig. 11 is a section of a further modified form of mold substantially on the line 11—11, Fig. 12, and Fig. 12 is a cross-section of the mold on the line 12—12, Fig. 11.

As shown in Figs. 1 and 2 the air tube consists of a plurality of compartments $a$ ... formed by partitions $b$ in a tube $c$, into each of which compartments $a$ leads a thin rubber tube $d$ normally communicating with a feed passage $e$ running around the inner periphery of the tube $c$ and provided with a valve $f$ for inflation purposes. Each of the compartments $a$ ... is of substantially D-shape and occupies the greater part of the cross-section of the tube $c$, and the feed passage $e$ is of similar shape and occupies but a small part of the cross-section of said tube, being divided from said compartments $a$ ... by a diaphragm $g$ formed within the feed passage $e$ with a pair of ribs $h$, $h$.

In the modified form illustrated by Figs. 3 and 4 the feed passage $e$ instead of being formed in the tube $c$ itself is formed by a separate portion $j$ secured to said tube by india-rubber solution or the like, while the ribs $h$, $h$ are formed on the tube $c$ and the thin rubber tubes $d$ ... are replaced by apertured nipples $k$ ...

The tube $c$ in both forms of the invention is formed, at that part which corresponds with the outer periphery or tread of the tire, with apertures $m$ ... opening into the several compartments $a$ ... and after a straight length of tube has been made as hereinafter set forth, and its ends joined together in the usual manner to constitute an annulus, these apertures $m$ are closed by a tread band $n$ (or a series of patches) vulcanized to the tube $c$.

The mold illustrated in Figs. 5 to 8 is adapted for the production of a tube $c$ of the sections shown in Figs. 1 and 2, the tube being produced tread downward, and comprises two outer sections $o$ and $p$ divided on a plane substantially midway between what will be the outer and inner peripheries of the finished tube, and adapted to be clamped together by bolts $q$, $q$ and nuts $r$, $r$, a plurality of cores $s \ldots$, means carried by said cores $s \ldots$ for producing in the tube the apertures in the thin rubber tubes $d \ldots$ and the apertures $m \ldots$, and a core $t$ for producing the feed passage $e$.

The sections $o$ and $p$ are provided at their adjacent surfaces with beveled ridges $u$, $u$ and $v$, $v$ respectively, the ridges $u$, $u$ being adapted to fit within the ridges $v$, $v$ and being grooved at intervals as at $w$, $w$ to permit the spewing out during the vulcanizing process of rubber which is forced between the contiguous portions of the sections $o$ and $p$, while the section $o$ is also formed at intervals along its length with pin holes opening into tapering apertures $x \ldots$ for spewing purposes.

Each core $s$ is of concavo-convex longitudinal section and has secured to its tread side by cheese-headed screws $y$, $y$, a plate $z$ of the same thickness as the tube to be produced and adapted to form in said tube an aperture $m$, and each core $s$ is adapted to be secured to the section $p$ of the mold with the cheese-heads of the screws $y$, $y$, fitting into corresponding recesses 20, 20 in the section $p$ of the mold to aline the core $s$, by a screw 21 which passes freely through an aperture in said section into threaded engagement with a passage 22 extending through said core and opening at the opposite side thereof through a fine spew hole. After the passage 22 has been bored in the core $s$, fine spewing passages 23, 23 are drilled at each side thereof, said passages 23, 23 being continued through the plate $z$ and through the section $p$ of the mold as shown in Figs. 5, 6 and 7. Each plate is formed transversely with grooves 24, 24 (Fig. 7) leading to the spewing passages 23, 23 and the latter in turn lead to spewing grooves 25, 25 cut in the head of the screw 21. Each core $s$ is formed with a threaded recess 26 adapted to receive one of the cheese-headed screws $y$ and also a grub screw 27 having a portion 28 of reduced diameter which may be adjustably projected into a corresponding recess 29 and which carries a fine wire or needle 30, the recess 29 and fine wire 30 being adapted to constitute a mold and core to form a thin rubber tube $d$.

The core $t$, which is adapted to form the feed passage $e$, contacts at one side with the several fine wires 30 $\ldots$ and is formed at that side with grooves 31, 31 for the production of the ribs $h$, $h$, and contacts at the other side with a projection 32 from the section $o$ of the mold, for the production of an aperture in the tube $c$ for the valve $f$.

As above mentioned the tube $c$ is made in a straight length and at each end of the mold is provided a half core such as $s^1$ adapted to produce half a compartment $a$, it being understood that the half core at the other end, not shown, is formed with passages and recesses to produce the other half of the compartment. The half core $s^1$ is formed with a circumferential flange 33 adapted to seat in corresponding grooves in the sections $o$ and $p$ of the mold, and the core $t$ is formed with an enlarged end 34, so as together to close the end of the mold, the half core $s^1$ being provided with pegs 35, 36 engaging recesses in the head 34 and section $p$ respectively to position said half core.

To produce the tube a strip of raw rubber, apertured approximately to correspond with the apertures $m \ldots$ is laid in the section $p$ of the mold with its lateral marginal portions over-lapping. A half core $s^1$ having been placed in position, a substantially D-shaped piece of raw rubber is placed against its inner end and a core $s$ is placed in position, the cheese-heads of the screws $y$, $y$, passing through the aperture in the raw rubber strip into the recesses 20, 20 and the core $s$ is then secured by means of the screw 21. Another D-shaped piece of raw rubber is placed against the convex end of this core $s$ and another core $s$ is secured in position and so on to the other end of the mold. The one lateral marginal portion of the raw rubber strip is then laid over the tops of the cores $s$ and if desired slightly down the far sides of the cores, and the core $t$ having been placed in position the other lateral marginal portion of the raw rubber strip is laid over the core $t$ and if desired beyond that part which is to produce the diaphragm $g$. The section $o$ of the mold is then placed in position and clamped down by means of the bolts $q$ and nuts $r$ and the whole mold is placed in a vulcanizer and the raw rubber is vulcanized.

After vulcanization is complete the sections $o$ and $p$ of the mold are separated, the cores $s \ldots$ are disengaged from the section $p$ and expelled from the tube through the apertures $m \ldots$ and the core $t$ is withdrawn.

A length of tube so produced is then joined up at its ends in the usual manner to constitute an annulus and the tread band $n$ or a series of patches is applied to close the apertures $m \ldots$, and vulcanized to the tube $c$.

The form of the mold shown in Figs. 9 and 10 is adapted for the production of a tube $c$ of the sections shown in Figs. 3 and 4, the tube being produced tread downward, and is constituted by somewhat similar sections 37 and 38 adapted to be clamped together by bolts $q$, $q$ and nuts $r$, $r$, a plurality of cores 39 $\ldots$ and means carried by the section 37 and cores 39 $\ldots$ for producing the apertures in the nipples $k \ldots$ and the apertures $m \ldots$ respectively.

Each core 39 has secured thereto by cheese-headed screws 40, 40 a plate 41 similar to the plate $z$ except that it is not apertured to give passage to a screw 21, the spew grooves 24, 24 leading to a spew passage 42 in the section 38 of the mold. The section 37 is formed with grooves 43, 43 for the production of ridges $h$, $h$, on the tube $c$ and has screwed through it fine wires or pins 44 ... adapted to project into cup-like recesses 45 ... in the cores 39 ... and to contact with the bottoms thereof for the production of the apertured nipples $k$ ...

The tube is produced in the mold substantially in the manner described with reference to Figs. 5 to 8 and when the tread band $m$ is attached thereto a separate band $j$ is also attached to form the feed passage $e$.

It is to be understood that the cores shown in Figs. 5 and 8 and in Figs. 9 and 10 may be adapted for the production of thin rubber tubes $d$ or apertured nipples $k$ as desired.

The form of mold illustrated by Figs. 11 and 12 is similar to that illustrated by Figs. 5 to 8, but the two sections 46, 47 of the mold are divided on a plane corresponding with the central vertical plane through a tube when in use, and in place of the cheese-headed screws $y$, $y$ and the screw 21, each core $s$ is secured in position by screws 48 which also serve to attach the plate $z$ to the core $s$ and which are adapted to be clamped between the two sections 46, 47 when assembled. If desired cores such as are shown in Figs. 9 and 10 may be employed.

In all forms of the invention it is desirable that the cores should be concavo-convex in longitudinal section as shown so that when the tube $c$ is fully inflated in use the partitions $b$ ... may not be in tension.

When a tube made in accordance with this invention is being inflated, air passes through the feed passage $e$ and thin tubes $d$ ... or apertured nipples $k$ ..., as the case may be, to all the compartments $a$ ..., the pressure being equally distributed throughout. In the event of a puncture of any compartment $a$ the reduction of pressure therein consequent upon the escape of air therefrom permits the partitions $b$, $b$, on either side thereof to belly out toward one another due to the pressure acting thereon, and this bellying out causes the thin tube $d$ in the punctured compartment to be bent over, thus breaking off the connection with said compartment of the feed passage $e$ and preventing further escape of air; or, in a case where apertured nipples $k$ ... are employed, the bellying out of a partition $b$ would cause said partition to bear down on the end of said nipple and seal the aperture therethrough. The partition $b$ ... separating the remaining compartments $a$ ... all belly out slightly toward the punctured compartment so that the pressure within the tire is once more equally distributed and the puncturing of the compartment will not materially affect the efficiency of the tire as a whole.

When it is desired purposely to deflate the tube, the ribs $h$, $h$, prevent the ends of the apertures through the tubes $d$ ... or nipples $k$ from being sealed by contact between the opposite faces of the feed passage $e$.

When a tread band such as $n$ is employed to close the apertures $m$, it may be found that in use the tension in the length thereof is greater than in any other part of the tube with the result that parts of the tube (especially those parts remote from the valve $f$) have a tendency to creep or turn around the circumferential axis of the tube with the result that the feed passage $e$ is outermost and the compartments $a$ ... innermost. This may be avoided by solutioning or otherwise affixing to the inner periphery of the tube a length of fabric or like relatively inextensible material.

I claim:—

1. A mold for the production of an air tube for a pneumatic tire as set forth, comprising two outer sections divided on a substantially central plane and adapted to be clamped together, a plurality of cores within said sections, means carried by said sections and (or) by said cores for producing in the tube the apertures through which the compartments communicate with the feed passage and the slits or apertures through which the cores are to be withdrawn, and, if required, means for producing the feed passage integrally with the air tube.

2. A mold as claimed in claim 1, for the production of an air tube for a pneumatic tire, wherein one of the sections of the mold is provided with a series of fine wires or needles adapted to project into recesses in the cores, for the production of the apertured projections from the feed passage, and wherein each of the cores has mounted thereon a plate for the production of a slit or aperture through which said core may be withdrawn.

3. A mold as claimed in claim 1, for the production of an air tube for a pneumatic tire, wherein each core is substantially D-shaped in cross section and has a fine wire or needle disposed in a recess therein so as to project into a portion of said recess which is of different diameter, for the production of an apertured projection from the feed passage, wherein each core has a plate mounted thereon for the production of a slit or aperture through which the said core may be withdrawn, and wherein a core is disposed adjacent the substantially flat sides of the D-shaped cores for the production of the feed passage, substantially as set forth.

4. A mold as claimed in claim 2, for the production of an air tube for a pneumatic tire, wherein each core is positioned in the mold by means of screws the heads of which fit into recesses in a section of the mold and which screws may serve also to secure to the core a plate for the production of a slit or aperture through which the core may be withdrawn, substantially as set forth.

5. A mold as claimed in claim 2, for the production of an air tube for a pneumatic tire, wherein the sections of the mold are divided on a plane corresponding with the central vertical plane of the tire when in use, and wherein each core is positioned in the mold by means of screws adapted to be clamped between the two sections of the mold and adapted, if desired, to secure to the core a plate for the production of a slit or aperture through which the core may be withdrawn, substantially as set forth.

6. A mold as claimed in claim 3, for the production of an air tube for a pneumatic tire, wherein each core is positioned in the mold by means of screws, the heads of which fit into recesses in a section of the mold and which screws may serve also to secure to the core a plate for the production of a slit or aperture through which the core may be withdrawn substantially as set forth.

7. A mold as claimed in claim 3, for the production of an air tube for a pneumatic tire, wherein the sections of the mold are divided at a plane corresponding with the central vertical plane of a tire when in use, and wherein each core is positioned in the mold by means of screws adapted to be clamped between the two sections of the mold, and adapted if desired, to secure to the core a plate for the production of a slit or aperture through which the core may be withdrawn, substantially as set forth.

THOMAS BAKER McLEROTH.